Jan. 25, 1966  J. H. DEL CEGNO  3,230,998
ROAD TIRE RUNNER
Filed June 1, 1964
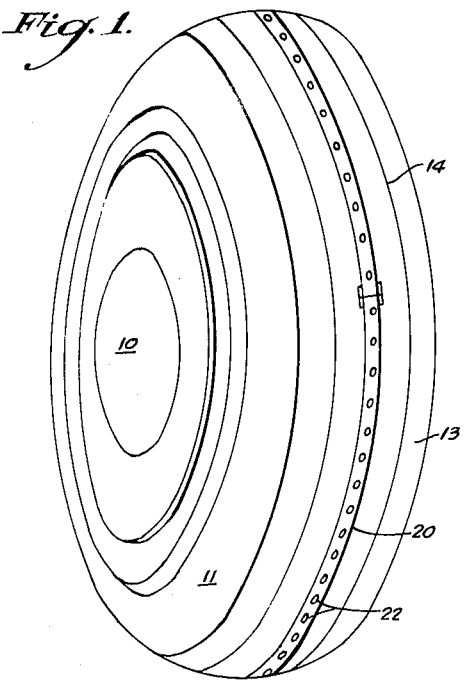
Fig. 1.
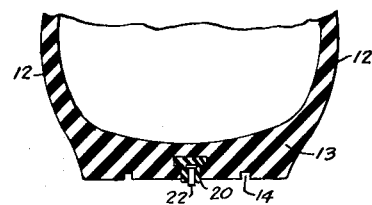
Fig. 2.
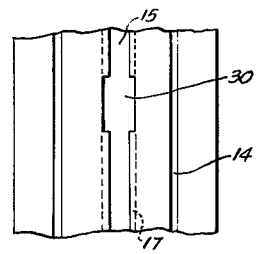
Fig. 3.
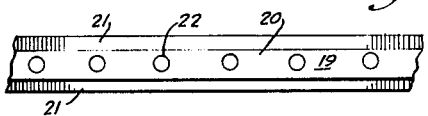
Fig. 4.
Fig. 6.
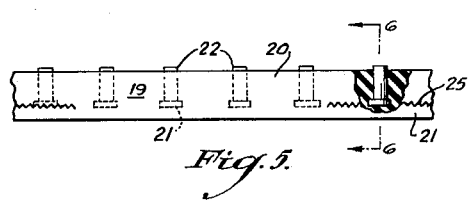
Fig. 5.
Fig. 8.
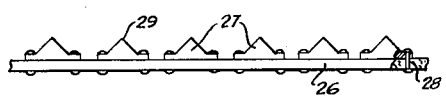
Fig. 7.
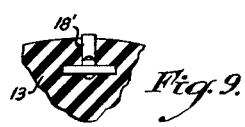
Fig. 9.
INVENTOR.
JOSEPH J. DEL CEGNO United States Patent Office 3,230,998
Patented Jan. 25, 1966

3,230,998
ROAD TIRE RUNNER
Joseph H. Del Cegno, 192 Daly Ave.,
New Britain, Conn.
Filed June 1, 1964, Ser. No. 371,474
2 Claims. (Cl. 152—210)

This invention relates generally to anti skid devices for road vehicles, and more specifically to an anti skid band which may be replaceably inserted around the periphery of a tire so as to greatly reduce skidding tendencies under poor road conditions.

Considerable attention has been paid to the provision of anti skid devices for inflatable vehicle tires, and these devices are normally designed for molding in the body of the rubber so as to protrude therefrom and so provide added traction when necessary. Such tire inserts greatly increase the cost of molding a tire due to the difficulty of accurate and consistent location in the mold, and further, such inserts have a tendency to tear loose from their molded mounting due to the high stresses exerted thereon under conditions of skidding and heavy acceleration and deceleration. My invention is directed to overcoming these disadvantages by first providing a groove around the periphery of the tire which in itself does not detract from the traction or life of the tire. For increased traction a composition band having selected properties is inserted into the groove so as to surround the tire and due to the self locking nature of the groove provides a protruding rim having the desired traction properties. This rim may be removed and replaced when desired until the full depth of the tire tread has been worn away.

It is therefore a primary object of this invention to provide an improved anti skid device for vehicle tires which is readily replaceable, easy to install, and is highly efficient in operation.

It is a further object of this invention to provide an anti skid insert for vheicle tires which is manufactured in long coils and cut to the length desired so as to extend around a groove formed in the periphery of the tire and be self locking therewithin.

Further objects and advantages of this invention will become apparent by the following detailed description of a preferred embodiment thereof, taken in conjunction with the attached drawings wherein:

FIG. 1 is a perspective view of a vehicle wheel showing the device of my invention mounted centrally around the periphery of the wheel tire.

FIG. 2 is a cross sectional fragmentary view taken through the tire wall and showing the anti skid rim inserted therein.

FIG. 3 is a fragmentary view of a tire tread showing the groove and access opening thereto which receives the anti skid rim.

FIG. 4 is a fragmentary view of a length of anti skid strip constructed in accordance with one embodiment of my invention.

FIG. 5 is a side elevation of the strip material shown in FIG. 4.

FIG. 6 is a cross sectional end elevation taken along the lines 6—6 of FIG. 5.

FIG. 7 is a side elevation shown partly in cross section of an alternative anti skid strip.

FIG. 8 is a fragmentary cross section of one shape of molded tire groove suitable for receiving the anti skid strip. The drawing is shown to represent the shape of the groove when the tire is deflated and the tire side walls depressed toward each other.

FIG. 9 is a cross sectional view of a fragment of tire showing the strip of FIG. 7 inserted in the groove, the tire being inflated such that the sides of the groove grippingly engage about the strip.

Similar reference characters indicate corresponding parts throughout the several views in the drawings.

Referring now to the drawings in detail, the numeral 10 represents a conventional vehicle wheel having an inflatable tire 11 mounted thereon. The tire has arcuate side walls 12 which support a relatively flat tread portion 13. Conventional tread grooves 14 extend about the periphery of the tire, and further tread cuts and shapes of conventional design are incorporated in the tread but have not been shown on the drawing for the sake of clarity.

An annular slot or groove 15 is formed inwardly of the tread 13 and extends around the periphery of the tire in a concentric and symmetrical manner. The groove 15 may be of any desired shape providing it performs with a locking function on an anti skid insert strip which may be fed into the groove in a manner to be described. One example of a satisfactory shape of groove is shown in FIG. 8, and is of substantially T cross section having a flat strip base 16 and inwardly directed under cut channels 17 extending to either side of tapering side walls 18. These side walls are designed such that they will close in a tightly embracing manner against the sides of a strip inserted in the slot when the tire is inflated as indicated at 18′ in FIG. 9. The slot or groove 15 may be if desired of dove tailed shape, or may be of circular cross section communicating with the periphery of the tire by a straight radial slot. The essential feature of the groove is that a portion thereof extends inwardly beneath the tire periphery and symmetrically towards the sides of the tire so as to provide an interlocking shape to retain an anti skid strip firmly in position.

An anti skid strip or road runner 19 is shown in one preferred form in FIGS. 4, 5 and 6 of the drawing. This strip has a T cross section adapted to be received in the annular slot 15. The strip has a central rib 20 with protruding side flanges 21 for engagement in the under cut channels 17 of the slot 15. The strip is molded from a suitable heat resistant synthetic material which is pliable and has a low thermal expansion and mounts a number of equally spaced heat treated studs 22 which protrude slightly from the top of the rib 20. The studs terminate within the base 23 of the molding with heads 24 having a larger diameter than the studs so as to form an effective anchor within the runner. The upper surfaces of the side flanges 21 are serrated as indicated at 25 so as to prevent slippage once the runner is inserted in the slot 15.

A second example of a suitable anti skid runner is indicated in FIG. 7, and comprises a strip of leather 26 to which is riveted a number of steel teeth or lugs 27. The teeth are riveted at each end by rivets 28 and form tapering knife edges 29 to provide traction with the road surface.

A further example of a suitable road runner would consist of a molded composition which is mixed with suitable abrasives to provide the added traction required. The shape and precise configuration of these road runners or strips is a matter of choice and should not be considered restricted to the examples shown.

The road runner or strips will be manufactured in coils and is inserted into the slot or groove 15 through an opening 30 having the same dimension as that of the slot base 16. Before insertion the slot is lubricated so as to slideably receive the strip through the opening and when inserted the ends of the strip abut with each other and are slid beyond the opening 30 so as to be fully locked in the operating position.

The frictional anti skid elements such as the studs 22 or the knife edges 29 are designed such that they will protrude slightly above the tread surface after tire inflation as clearly seen in Figs. 2 and 9.

Having described the invention in a preferred form, it will be appreciated that some modifications may be made to the precise configuration, without departing from the scope or spirit of the invention, as defined by the following claims.

I claim:

1. An anti-skid device for a vehicle tire, comprising an elongated strip, frictional anti-skid elements protruding from one side of the strip, said tire having a tread with an annular peripheral groove formed therein to receive the strip, said groove having a shape adapted to retain said strip, said elements protruding outwardly of said groove, said strip comprising a central rib, flanges protruding from the sides of the rib, said groove being shaped to provide walls to grippingly engage over said flanges and part of said central rib, and said groove defining an enlarged opening for receiving one end of said strip for insertion into said groove.

2. An anti skid replaceable road engaging runner for mounting in the tread portion of a vehicle tire, and comprising, an elongated strip of molded synthetic composition and including a central rib portion and protruding side flanges, studs molded in said strip and protruding from said central rib, said tread having an annular groove formed therein having a shape similar to that of the strip, an opening in said groove to provide access for insertion of the strip into the groove, said studs positioned to protrude outwardly of the groove, and serrations on said strip flanges to provide increased frictional engagement of the strip within the groove.

References Cited by the Examiner
UNITED STATES PATENTS

| | | | |
|---|---|---|---|
| 1,814,340 | 7/1931 | Shelton et al. | 152—176 |
| 2,102,784 | 12/1937 | Bridges | 152—211 X |
| 3,125,147 | 3/1964 | Hakka | 152—210 |

ARTHUR L. LA POINT, *Primary Examiner.*